US009116856B2

(12) United States Patent
Govindaraman

(10) Patent No.: US 9,116,856 B2
(45) Date of Patent: Aug. 25, 2015

(54) INTELLIGENT DUAL DATA RATE (DDR) MEMORY CONTROLLER

(71) Applicant: QUALCOMM Incorporated, San Diego, CA (US)

(72) Inventor: Ravikumar Govindaraman, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 13/672,346

(22) Filed: Nov. 8, 2012

(65) Prior Publication Data

US 2014/0129766 A1 May 8, 2014

(51) Int. Cl.
*G06F 12/00* (2006.01)
*G06F 13/16* (2006.01)
*G06F 13/28* (2006.01)

(52) U.S. Cl.
CPC ............ *G06F 13/1668* (2013.01); *G06F 13/28* (2013.01); *Y02B 60/1228* (2013.01)

(58) Field of Classification Search
CPC .................................................. G06F 13/1668
USPC ........................................................ 711/105
See application file for complete search history.

(56) References Cited

U.S. PATENT DOCUMENTS

| 6,529,968 | B1 | 3/2003 | Anderson |
| 6,594,748 | B1 * | 7/2003 | Lin ................................ 711/167 |
| 6,732,243 | B2 | 5/2004 | Busser et al. |
| 7,606,950 | B2 | 10/2009 | Breyer |
| 7,836,220 | B2 | 11/2010 | Desai et al. |
| 7,865,784 | B1 | 1/2011 | White et al. |
| 2005/0182893 | A1 * | 8/2005 | Suh ................................ 711/103 |
| 2005/0210163 | A1 | 9/2005 | Suzuki et al. |
| 2011/0007583 | A1 * | 1/2011 | Lee et al. ................. 365/189.17 |
| 2012/0131253 | A1 | 5/2012 | McKnight et al. |
| 2012/0151159 | A1 * | 6/2012 | Muralimanohar et al. ... 711/154 |
| 2012/0290881 | A1 * | 11/2012 | Moallem et al. ................. 714/37 |

FOREIGN PATENT DOCUMENTS

EP 1396792 A1 3/2004

OTHER PUBLICATIONS

International Search Report and Written Opinion—PCT/US2013/063882—ISA/EPO—Mar. 4, 2014.

\* cited by examiner

*Primary Examiner* — Cheng-Yuan Tseng
*Assistant Examiner* — Zubair Ahmed
(74) *Attorney, Agent, or Firm* — Nicholas A. Cole

(57) ABSTRACT

Various embodiments include systems, methods, and devices configured to reduce the amount of information communicated via system buses/fabrics when transferring data to and from one or more memories. A system master component may send a source address and a destination address to a direct memory access controller inside of, or adjacent to, a memory controller. The direct memory access controller and/or the memory controller may determine whether the source and destination addresses are inside relevant portions of the memory. When both the source and destination are inside the relevant portion of the memory, the memory controller may perform a memory-to-memory data transfer without accessing the system bus.

24 Claims, 7 Drawing Sheets

INTELLIGENT DUAL DATA RATE (DDR) MEMORY CONTROLLER

BACKGROUND

Cellular and wireless communication technologies have seen explosive growth over the past several years. Wireless service providers now offer a wide array of features and services, and provide their users with unprecedented levels of access to information, resources and communications. To keep pace with these service enhancements, mobile electronic devices (e.g., cellular phones, tablets, laptops, etc.) have become more feature rich and complex than ever. Mobile electronic devices now commonly include multiple processors, system-on-chips (SoCs), multiple memories, and other resources (e.g., power rails, etc.) that allow mobile device users to execute complex and power intensive software applications (e.g., video streaming, multimedia processing, etc.) on their mobile devices. As mobile devices and related technologies continue to grow in popularity and use, improving the performance capabilities and power consumption characteristics of mobile devices are expected to become important and challenging design criteria for mobile device designers.

SUMMARY

The various aspects include a memory system that includes a memory, a memory controller coupled to the memory, and a direct memory access (DMA) controller coupled directly to the memory controller. In an aspect, the direct memory access (DMA) controller may be coupled directly to the memory controller so that the direct memory access (DMA) controller and the memory controller are positioned on the same side of a system data bus. In a further aspect, the memory controller may be a dynamic random-access memory (DRAM) memory controller. In a further aspect, the memory controller may be a double data rate (DDR) memory controller and the memory may be a DDR synchronous dynamic random-access memory.

In a further aspect, the direct memory access controller may be configured to perform operations that include receiving a source address and a destination address, determining whether the source address is in the memory, determining whether the destination address is in the memory in response to determining that the source address is in the memory, and copying data stored at the source address to the destination address without pushing any data onto a bus in response to determining that the destination address is in the memory. In a further aspect, the direct memory access controller may be configured to perform operations that include pushing data stored at the source address onto the bus in response to determining that the destination address is not in the memory. In a further aspect, the direct memory access controller may be configured to perform operations that include pushing a read request, the source address, and the destination address on to the bus in response to determining that the source address is not in the memory.

Further aspects include a computing device that includes a system data bus, a processor coupled to the system data bus, and a memory system coupled to the system data bus. The memory system may include a memory, a memory controller coupled to the memory, and a direct memory access controller coupled directly to the memory controller. In an aspect, the direct memory access controller may be coupled directly to the memory controller so that the direct memory access controller and the memory controller are positioned on the same side of a system data bus. In a further aspect, the memory controller may be a dynamic random-access memory (DRAM) memory controller. In a further aspect, the memory controller may be a double data rate (DDR) memory controller and the memory may be a DDR synchronous dynamic random-access memory.

In a further aspect, the direct memory access controller may be configured to perform operations including receiving a source address and a destination address, determining whether the source address may be in the memory, determining whether the destination address may be in the memory in response to determining that the source address may be in the memory, and copying data stored at the source address to the destination address without pushing any data onto a bus in response to determining that the destination address may be in the memory. In a further aspect, the direct memory access controller may be configured to perform operations further including pushing data stored at the source address onto the bus in response to determining that the destination address may be not in the memory. In a further aspect, the direct memory access controller may be configured to perform operations further including pushing a read request, the source address, and the destination address on to the bus in response to determining that the source address may be not in the memory.

Further aspects include methods of transferring data to and from one or more memories, including receiving a source address and a destination address in a direct memory access controller coupled directly to a memory controller, determining in the memory controller whether the source address may be in a memory coupled to the memory controller, determining in the memory controller whether the destination address may be in the memory, and copying data stored at the source address to the destination address without pushing any data onto a bus when the memory controller determines that both the source address and the destination address are in the memory.

In an aspect, the method may include pushing data stored at the source address onto the bus in response to determining that the destination address may be not in the memory. In a further aspect, the method may include pushing a read request, the source address, and the destination address on to the bus in response to determining that the source address may be not in the memory. In a further aspect, receiving a source address and a destination address in a direct memory access controller coupled directly to a memory controller may include receiving the source address and the destination address in a direct memory access controller positioned on the same side of a system data bus as a memory controller.

In a further aspect, determining in the memory controller whether the source address may be in a memory coupled to the memory controller may include determining in a dynamic random-access memory (DRAM) memory controller whether the source address may be in the memory. In a further aspect, determining in the memory controller whether the source address may be in a memory coupled to the memory controller may include determining in a double data rate (DDR) memory controller whether the source address may be in a DDR synchronous dynamic random-access memory.

Further aspects include a computing device having means for receiving a source address and a destination address in a direct memory access controller coupled directly to a memory controller, means for determining in the memory controller whether the source address may be in a memory coupled to the memory controller, means for determining in the memory controller whether the destination address may be in the memory, and means for copying data stored at the source address to the destination address without pushing any data onto a bus when the memory controller determines that both the source address and the destination address are in the memory.

In an aspect, the computing device may include means for pushing data stored at the source address onto the bus in response to determining that the destination address may be not in the memory. In a further aspect, the computing device may include means for pushing a read request, the source address, and the destination address on to the bus in response to determining that the source address may be not in the memory. In a further aspect, means for receiving a source address and a destination address in a direct memory access controller coupled directly to a memory controller may include means for receiving the source address and the destination address in a direct memory access controller positioned on the same side of a system data bus as a memory controller.

In a further aspect, means for determining in the memory controller whether the source address may be in a memory coupled to the memory controller may include means for determining in a dynamic random-access memory (DRAM) memory controller whether the source address may be in the memory. In a further aspect, means for determining in the memory controller whether the source address may be in a memory coupled to the memory controller may include means for determining in a double data rate (DDR) memory controller whether the source address may be in a DDR synchronous dynamic random-access memory.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
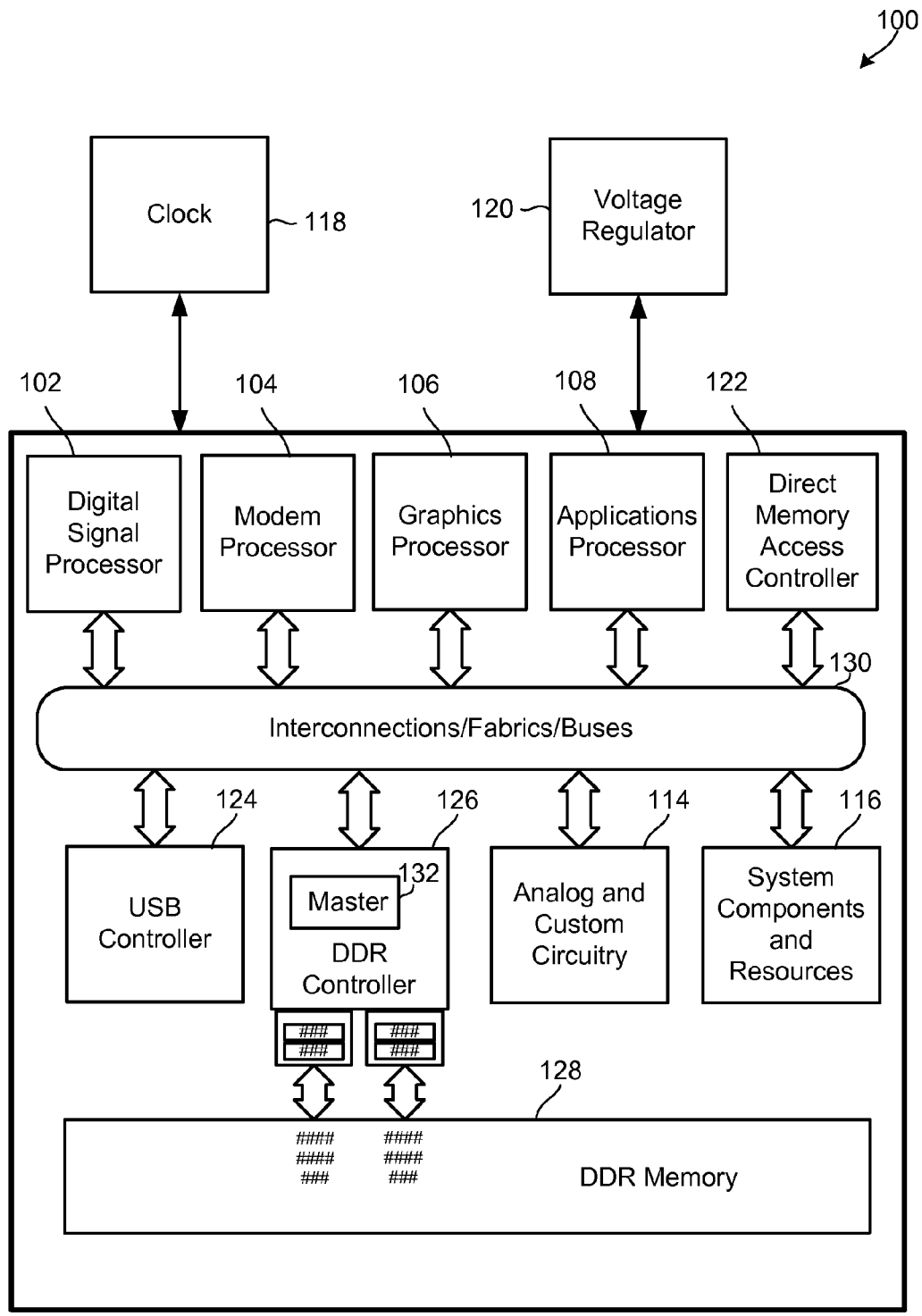
FIG. 1 is a component block diagram illustrating an example system-on-chip (SOC) architecture implementing the various aspects.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile device" are used interchangeably herein to refer to any one or all of servers, personal computers, smartphones, cellular telephones, tablet computers, laptop computers, netbooks, ultrabooks, palm-top computers, personal data assistants (PDA's), wireless electronic mail receivers, multimedia Internet enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., CPU cores, etc.) configured to read and execute program instructions. The term "multiprocessor" is used herein to refer to a system or device that includes two or more processing units configured to read and execute program instructions.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.), any or all of which may be included in one or more cores.

A number of different types of memories and memory technologies are available or contemplated in the future, all of which are suitable for use with the various aspects. Such memory technologies/types include phase change memory (PRAM), dynamic random-access memory (DRAM), static random-access memory (SRAM), non-volatile random-access memory (NVRAM), pseudostatic random-access memory (PSRAM), double data rate synchronous dynamic random-access memory (DDR SDRAM), and other random-access memory (RAM) and read-only memory (ROM) technologies known in the art. A DDR SDRAM memory may be a DDR type 1 SDRAM memory, DDR type 2 SDRAM memory, DDR type 3 SDRAM memory, or a DDR type 4 SDRAM memory. Each of the above-mentioned memory technologies include, for example, elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language.

In recent years, mobile computing device architectures have grown in complexity, and now commonly include multiple processor cores, system-on-chips (SOCs), co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.). With this rise in complexity, new memory management solutions are required to improve the computational and power management performance of mobile devices.

Due to the complexity of modern computing device architectures, device performance may depend on the speed, width, and bandwidth of the device's communication buses. Yet, existing memory management systems require extensive use of system buses to read and write data to and from memory, which may consume a large amount of the bus bandwidth, consume power, and degrade the overall device performance (e.g., responsiveness, etc.).

The various aspects reduce the amount of information communicated via system buses/fabrics when transferring data to and from one or more memories, improving device performance and reducing power consumption.

Generally, memory operations (e.g., read, write, etc.) require the performance of a number of simple yet time-consuming operations. Since processing speeds are much faster than memory access speeds, a processor (or peripheral component) may offload memory operations to a direct memory access (DMA) controller and continue performing processing tasks while the DMA controller manages the performance of the memory operations.

The DMA controller is an external master component (e.g., a bus master) that drives a slave memory controller, which interfaces with the physical memory (e.g., SDRAM, etc.) to perform read and write operations. In a conventional computer architecture, the external master (e.g., a DMA controller, etc.) drives the memory controller via the system bus. In many operations, driving the memory controller via the system bus is necessary, such as when moving data from memory to a processor for use, since the system bus is the data pathway between the two components.

However, the system bus has limited bandwidth, so performing memory operations that merely move instructions and data from one memory location to another can unnecessarily consume a key device resource. For example, when performing a memory-to-memory data transfer in a conventional architecture, a DMA controller operating as an external master sends a read command and a memory address to a memory controller via a system bus. In response, the memory controller pulls the read command and memory address from the system bus, locates a row and a column in a physical memory associated with the memory address, retrieves the data from the physical memory, and pushes the retrieved data onto the system bus. The DMA controller then pulls the data from the bus, stores the data in a buffer, and pushes a write command, a new address, and the data back onto the system bus. The memory controller then pulls the write command, the new address, and the data from the bus, and writes the data to the new address in the physical memory. Thus, in order to move data from one portion of a physical memory to another portion of the same physical memory, the data must be transmitted over the bus twice. Each of these data transfers over the system bus occupies the key inter-processor data pathway, during which instructions and data cannot be passed to or among other processors or modules. Therefore, even though the data is being moved from one address location to another within the same memory chip, the operations must interrupt data communications among other device modules. On systems that perform a significant number of memory-to-memory data transfers, sending such information (read/write commands, addresses, data, etc.) back and forth over the bus needlessly ties up the bus bandwidth, wastes power, and degrades the performance/responsiveness of the computing device.

The various aspects include a memory controller that includes a master component configured to perform memory-to-memory data transfers without pushing and/or pulling information to/from a system bus. In an aspect, the master component may be configured to perform direct memory access (DMA) operations. In an aspect, master component may be a DMA controller. In another aspect, the master component may communicate with an external DMA controller.

The various aspects may be implemented in a wide variety of computing systems, including single processor systems, multi-processor systems, multicore processor systems, systems-on-chip (SOC), or any combination thereof.

FIG. 1 illustrates example components and interconnections in a system-on-chip (SOC) 100 suitable for implementing the various aspects. The SOC 100 may include a number of heterogeneous processors, such as a digital signal processor (DSP) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that they may operate at a much higher frequency/clock-rate than would be possible if the signals were to travel off-chip. The proximity of the cores may also allow for the sharing of on-chip memory and resources (e.g., voltage rail), as well as for more coordinated cooperation between cores.

The SOC 100 may include analog circuitry and custom circuitry 114 for managing sensor data, analog-to-digital conversions, wireless data transmissions, and for performing other specialized operations (e.g., decoding high-definition video, video processing, etc.). The SOC 100 may further include various system components and resources 116, such as voltage regulators, oscillators, phase-locked loops, peripheral bridges, data controllers, system controllers, access ports, timers, and other similar components used to support the processors and software clients running on the computing device. The system components 116 and custom circuitry 114 may also include circuitry for interfacing with peripheral devices, such as cameras, electronic displays, wireless communication devices, external memory chips, etc.

The SOC 100 may further include a direct memory access (DMA) controller 122, a universal serial bus controller 124, and one or more memory controllers 126. The SOC 100 may also include an input/output module (not illustrated) for communicating with resources external to the SOC, such as a clock 118 and a voltage regulator 120, each of which may be shared by two or more of the internal SOC components.

The processors 102, 104, 106, 108 may be interconnected to the DMA controller 124, the USB controller 124, the memory controller 126, resources 116, custom circuitry 114, and other system components via an interconnection/bus module 130, which may include an array of reconfigurable logic gates and/or implement a bus architecture (e.g., CoreConnect, AMBA, etc.). Communications may also be provided by advanced interconnects, such as high performance networks-on chip (NoCs).

The DMA controller 122 may be a specialized hardware module configured to manage the performance of the memory operations. The processors 102, 104, 106, 108 and other SOC components may offload memory operations to the DMA controller 122, and perform higher level or more complex tasks while the DMA controller 122 manages the performance of the memory operations.

The DDR memory controller 126 may be a specialized hardware module configured to manage the flow of data to and from a DDR memory array 128. The DDR memory controller 126 may include logic for interfacing with the DDR memory arrays 128, such as selecting a row and column corresponding to a memory location, reading or writing data to the memory location, etc.

The interconnection/bus module 130 may include or provide a bus mastering system configured to grant SOC components (e.g., processors, peripherals, etc.) exclusive control of the bus (e.g., to transfer data in burst mode, block transfer mode, etc.) for a set duration, number of operations, number of bytes, etc. In an aspect, the bus module 130 may include a DMA controller that enables components connected to the bus module 130 to operate as a master component and initiate memory transactions. The bus module 130 may also implement an arbitration scheme to prevent multiple master components from attempting to drive the bus simultaneously.

Existing memory controllers are "slave-only" components. Therefore, to accomplish memory operations, an external master (e.g., a DMA controller 122, USB controller 124, applications processor 108, etc.) must drive the memory controller (e.g., DDR controller 126) via a bus (e.g., the bus module 130). For example, when performing a memory-to-memory data transfer, a DMA controller may be required to send a read command and a source memory address to the memory controller via the bus. The memory controller may receive the read command and source memory address, locate a row and a column associated with the source memory address in the memory, retrieve the data, and push the retrieved data onto the bus. The DMA controller may receive and store the data in a buffer (not illustrated), and push a write command, a destination address, and the data onto the bus. The memory controller may receive the write command, destination address and data, and write the data to the destination address. Thus, using existing solutions, the data being moved must be transmitted over the bus twice. As discussed above, on systems that perform a significant number of memory-to-memory data transfers, sending such information (read/write commands, addresses, data, etc.) back and forth over the bus needlessly ties up the bus bandwidth, wastes power, and degrades the performance and responsiveness of the SOC and computing device.

The DDR memory controller 126 may include a master component 132 configured to perform memory-to-memory transfer operations without the use of the system bus. In an aspect, the master component 132 may be configured to perform DMA operations. In an aspect, the master component 132 may be a DMA controller.

Figure 2:
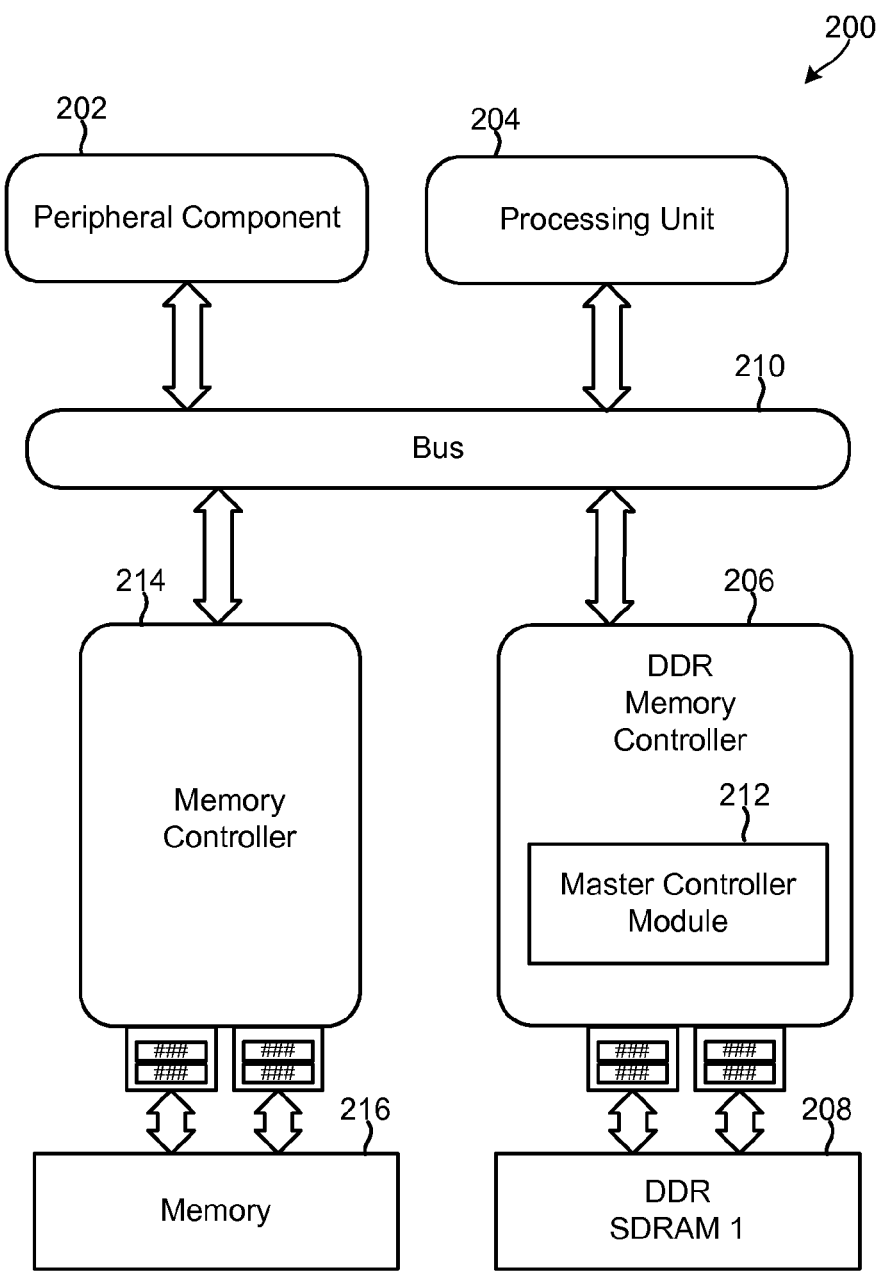
FIGS. 2-3 are function block diagrams illustrating various components in example computer systems implementing the various aspects.

FIG. 2 illustrates logical components and information flows in an example computing system 200 having a DDR memory controller configured in accordance with the various aspects. In the example illustrated in FIG. 2, the computing system 200 includes a peripheral component 202, a processing unit 204, a DDR memory controller 206, a DDR SDRAM memory 208, a second memory controller 214 and a second memory 214. The DDR memory controller 208 may include a master controller module 212 configured to perform various DMA and memory operations. In various aspects, the peripheral component 202 may be a USB controller, a USB module, or a USB device. In an aspect, the second memory controller 214 may be a DDR memory controller.

The peripheral component 202, processing unit 204 and the DDR memory controller 206 may be coupled to a system bus 210. The DDR memory controller 206 may be coupled to the DDR SDRAM 208 via a DDR-PHY interface and/or a memory bus.

The peripheral component 202 and/or processing unit 204 may be configured to initiate a data transfer operation by pushing onto the bus 210 a source address identifying a memory location of the data to be transferred, the number of bytes that are to be copied, and a destination address identifying a memory location to which the data is to be transferred. The master controller module 212 of the DDR memory controller 206 may pull the source address, number of bytes, and destination address from the bus 210, and determine whether the source and destination addresses identify memory locations inside the DDR SDRAM 208.

When the master controller module 212 determines that both the source address and the destination address identify locations outside of the DDR SDRAM 208, the master controller module 212 may perform conventional DMA operations to manage the transfer of the data from the source address to the destination address. For example, the master controller module 212 may send a read command and the source address to the second memory controller 214 via the bus 210, receive data from the second memory controller 214 via the bus 210, store the data in a buffer (not illustrated), and send a write command, destination address, and the data to the second memory controller 214 via the bus 210.

When the master controller module 212 determines that both the source address and the destination addresses identify locations inside the DDR SDRAM 208, the master controller module 212 may automatically transfer the data from the source address to the destination address, without pushing any of the transferred data onto the bus. In this manner, the various aspects may accomplish memory-to-memory data transfers without sending information (read/write commands, addresses, data, etc.) back and forth over the bus 210, which increases the bandwidth available on the bus 210, reduces power consumption, and improves the performance/responsiveness of the computing device.

When the master controller module 212 determines that the source address identifies a location inside the DDR SDRAM 208, but that the destination address references a location outside of the DDR SDRAM 208, the master controller module 212 may retrieve data from the source address (in the DDR SDRAM 208), and send the retrieved data and the destination address to the second memory controller 214 via the bus 210.

Thus, as opposed to conventional solutions that require pushing the data onto the bus 210 twice (i.e., once after retrieving the data and once for writing the data), various aspects may accomplish memory-to-memory transfer operations by pushing data onto the bus 210 only once. In this manner, the various aspects reduce the amount of data communicated via the bus 210 during a memory-to-memory, increasing bus bandwidth, reducing power consumption, and improving performance/responsiveness of the computing device.

Figure 3:
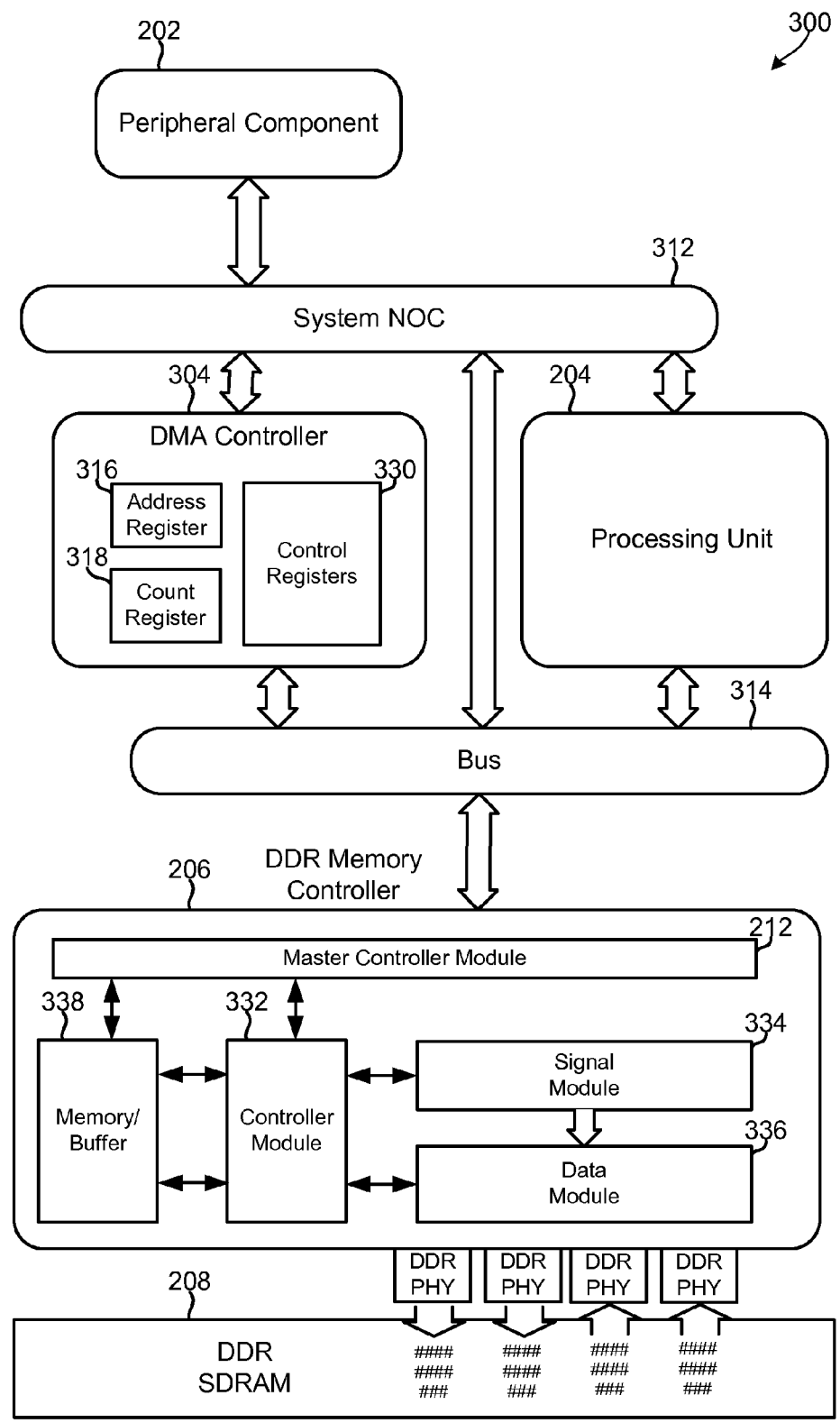

FIG. 3 illustrates logical components and information flows in another example computing system 300 that include an aspect DDR memory controller and an external DMA controller. In the example illustrated in FIG. 3, the computing system 300 includes a peripheral component 202, a DMA controller 304, a processing unit 204, a DDR memory controller 206, and DDR SDRAM memory 208. In an aspect, the computing system 300 may include a plurality of DDR SDRAM memories 208 and one DDR memory controller 206 for each of the plurality of DDR SDRAM memories 208.

The peripheral component 202, DMA controller 304, and processing unit 204 may be coupled to a system network on chip (NOC) 312. The DMA controller 304, processing unit 204, and DDR memory controller 206 may be coupled to a system bus 314. The DDR memory controller 206 may be coupled to the DDR SDRAM 208 via a DDR-PHY interface and/or a memory bus.

The DMA controller 304 may include a memory address register 316, a byte count register 318, and control registers 320. The control registers 320 may store various different types of information for accomplishing memory operations, such as information for identifying an operation type, a source or target component, a direction of transfer, transfer units (e.g., one byte at a time, one word at a time, etc.), transfer or burst modes, number of bytes to transfer in each burst, etc.

The DDR memory controller 206 may include a master controller module 212 configured to perform various DMA memory operations. In an aspect, the master controller module 212 may include circuitry that is integrated with the circuitry of the DDR memory controller 206. In an aspect, the master controller module 212 may include circuitry coupled to the circuitry of the DDR memory controller 206.

The DDR memory controller 206 may also include a controller module 322, a signal module 324, a data module 336, and a local memory/buffer 338. The controller module 322 may include a refresh counter and state machine logic configured to generate various control signals (e.g., istate, cstate, etc.). The signal module 334 may be configured to generate address and command signals for DDR SDRAM memory 208 based on the control signals. The data module 336 may be configured to perform data latch and dispatch operations to read data from, and write data to, the DDR SDRAM memory 208 (e.g., via the DDR-PHY interface and/or memory bus).

The peripheral component 202 may be configured to initiate a memory operation by sending to the DMA controller 304 or processing unit 204 the memory operation to be performed (read, write, transfer, etc.), the relevant memory addresses, and a number of bytes (or words, bits, etc.) required to perform the operation via the system NOC 312. The DMA controller 204 and/or processing unit 306 may be configured to identify the correct instance of the DDR memory controller 206 and/or send the relevant memory addresses (e.g., source and destination addressees) to the DDR memory controller 206 in response to the peripheral component 202 initiating the memory operation.

The master controller module 212 of the DDR memory controller 206 may be configured to pull a source address and a destination address from the bus 314, and determine whether the source and destination addresses identify memory locations inside the DDR SDRAM 208. When both the source address and the destination addresses identify locations inside the DDR SDRAM 208, the master controller module 212 may automatically transfer the data from the source address to the destination address, without pushing any of the transferred data onto the bus 314. In an aspect, transferring the data from the source address to the destination address may include reading data from a first location in the DDR SDRAM 208, storing the data in the local memory 338, and the writing data stored in the local memory 338 to a second location in the DDR SDRAM 208.

In an aspect, the master controller module 212 may be configured to perform DMA operations in response to determining that both the source address and the destination address reference locations outside the boundary of the DDR SDRAM 208. In another aspect, the master controller module 212 may be configured to allow the DMA controller 304 to perform the memory transfer operations when the source address and/or destination address reference locations outside the boundary of the DDR SDRAM 208. For example, the master controller module 212 may be configured to notify the DMA controller 304 that both the source and/or destination addresses reference locations outside the boundaries of the DDR SDRAM 208, and wait for the next memory request. In this manner, the DDR memory controller 206 may operate as a conventional memory controller when the source address and/or destination address are outside the boundary of the DDR SDRAM 208 over which it has control.

Figure 4:
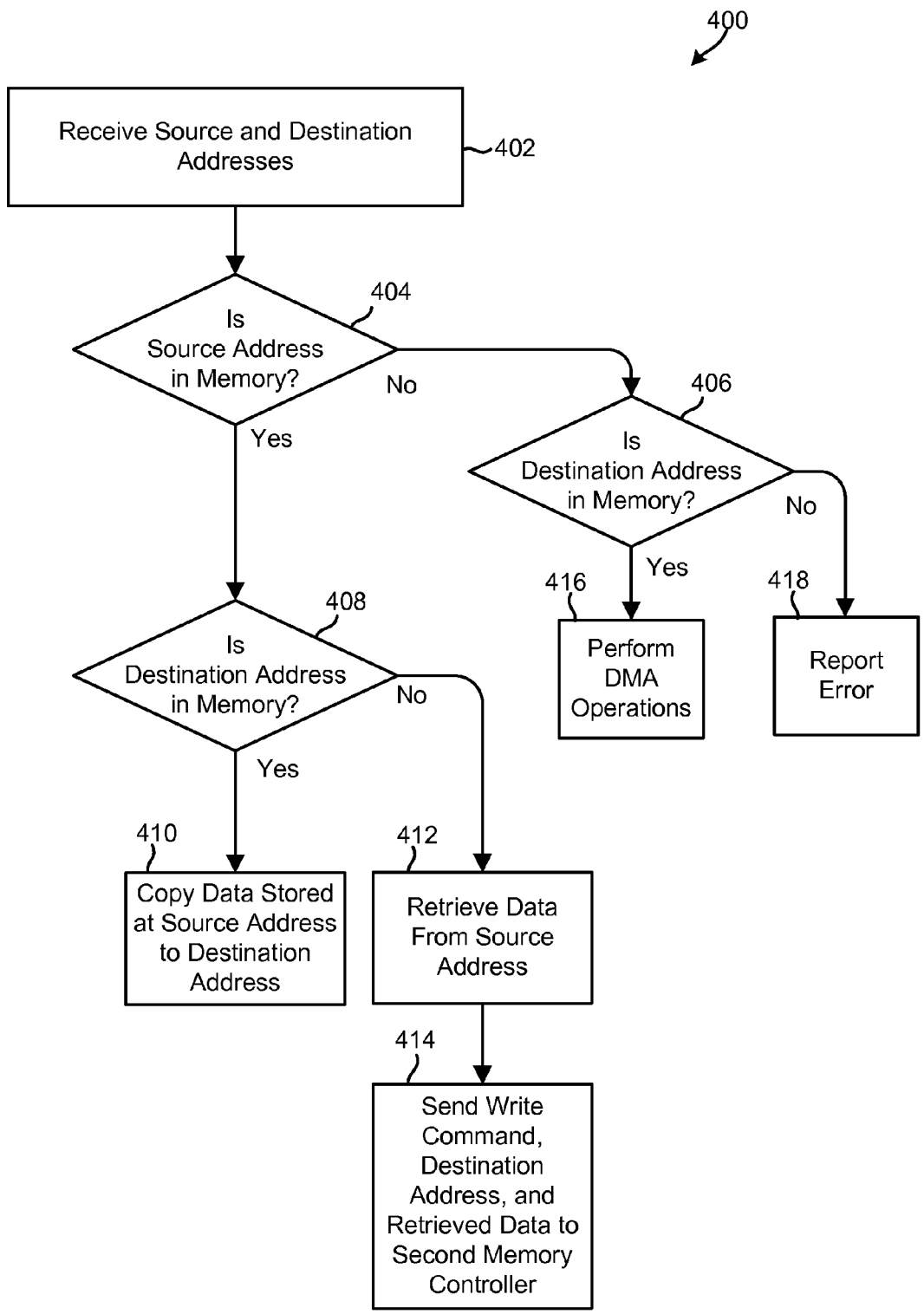
FIGS. 4-5 are process flow diagrams of aspect memory controller methods of performing memory-to-memory transfers.

FIG. 4 illustrates an aspect method 400 of performing memory-to-memory transfer operations by an aspect memory controller. In block 402, a memory controller (e.g., DDR memory controller 206) may receive a source address and a destination address via a system bus. In determination block 404, the memory controller may determine whether the source address is a memory location that is directly accessible to the memory controller (e.g., via a memory bus, a PHY interface, etc.). For example, the memory controller may determine whether the address may be translated into a row and column data address that is within boundaries of a memory (DRAM, DDR SDRAM, etc.) over which the memory controller has direct control and/or responsibility.

When the memory controller determines that the source address is not a memory location directly accessible to the memory controller (i.e., determination block 404="No"), in determination block 406, the memory controller may determine whether the destination address is a memory location that is directly accessible to the memory controller (e.g., within boundaries of a memory over which the memory controller has direct control/responsibility, etc.). When the memory controller determines that the destination address is a memory location directly accessible to the memory controller (i.e., determination block 406="Yes"), in block 416, the memory controller may perform DMA operations. As discussed above, the DMA operations may include pushing a read instruction and a source address onto the bus, receiving and storing data in a local memory, and pushing a write command, the stored data, and the destination address onto the bus. When the memory controller determines that the destination address is not a memory location directly accessible to the memory controller (i.e., determination block 406="No"), in block 418, the memory controller may generate and report an error.

When the memory controller determines that the source address is a memory location directly accessible to the memory controller (i.e., determination block 404="Yes"), in determination block 408, the memory controller may determine whether the destination address is a memory location that is directly accessible to the memory controller (e.g., within boundaries of a memory over which the memory controller has direct control/responsibility, etc.). When the memory controller determines that the destination address is a memory location directly accessible to the memory controller (i.e., determination block 408="Yes"), in block 410, the memory controller may copy the data stored at the source address to the destination address.

When the memory controller determines that the destination address is not a memory location directly accessible to the memory controller (i.e., determination block 408="No"), in block 412, the memory controller may retrieve the data stored at the source address. In block 414, the memory controller may send a write command, the destination address, and the retrieved data to a second memory controller (e.g., by pushing the information on to the bus, etc.).

Figure 5:
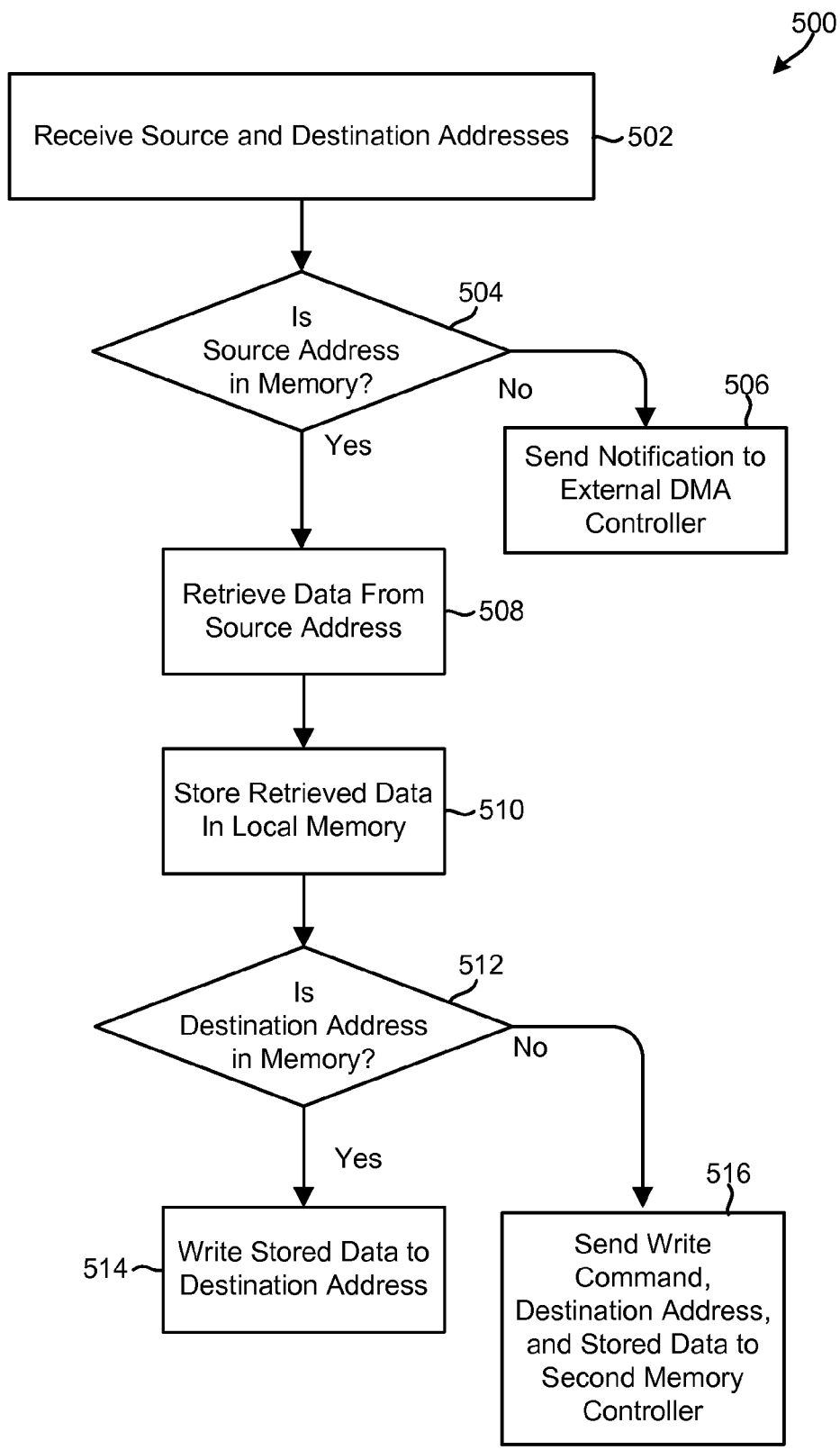

FIG. 5 illustrates another aspect method 500 of performing memory-to-memory transfer operations by an aspect memory controller. In block 502, a memory controller (e.g., DDR memory controller 206) may receive a source address and a destination address via a system bus. In determination block 504, the memory controller may determine whether the source address is a memory location that is directly accessible to the memory controller (e.g., via a memory bus, a PHY interface, etc.). For example, the memory controller may determine whether the address may be translated into a row and column data address that is within boundaries of a memory (DRAM, DDR SDRAM, etc.) over which the memory controller has direct control/responsibility.

When the memory controller determines that the source address is not a memory location directly accessible to the memory controller (i.e., determination block 504="No"), in block 506, the memory controller may generate and send a notification (e.g., control signal, message, etc.) to an external DMA controller, which may cause the external DMA controller to perform the memory-to-memory transfer operations.

When the memory controller determines that the source address is a memory location directly accessible to the memory controller (i.e., determination block 504="Yes"), in block 508, the memory controller may retrieve the data stored at the source address. In block 510, the memory controller may store the data in a local memory.

In determination block 512, the memory controller may determine whether the destination address is a memory location that is directly accessible to the memory controller (e.g., within boundaries of a memory over which the memory controller has direct control/responsibility, etc.). When the memory controller determines that the destination address is a memory location directly accessible to the memory controller (i.e., determination block 512="Yes"), in block 512, the memory controller may copy the data stored in the local memory to the destination address. When the memory controller determines that the destination address is not a memory location directly accessible to the memory controller (i.e., determination block 512="No"), in block 516, the memory controller may send a write command, the destination address, and data stored in the local memory to a second memory controller (e.g., by pushing the information on to the bus, etc.).

Figure 6:
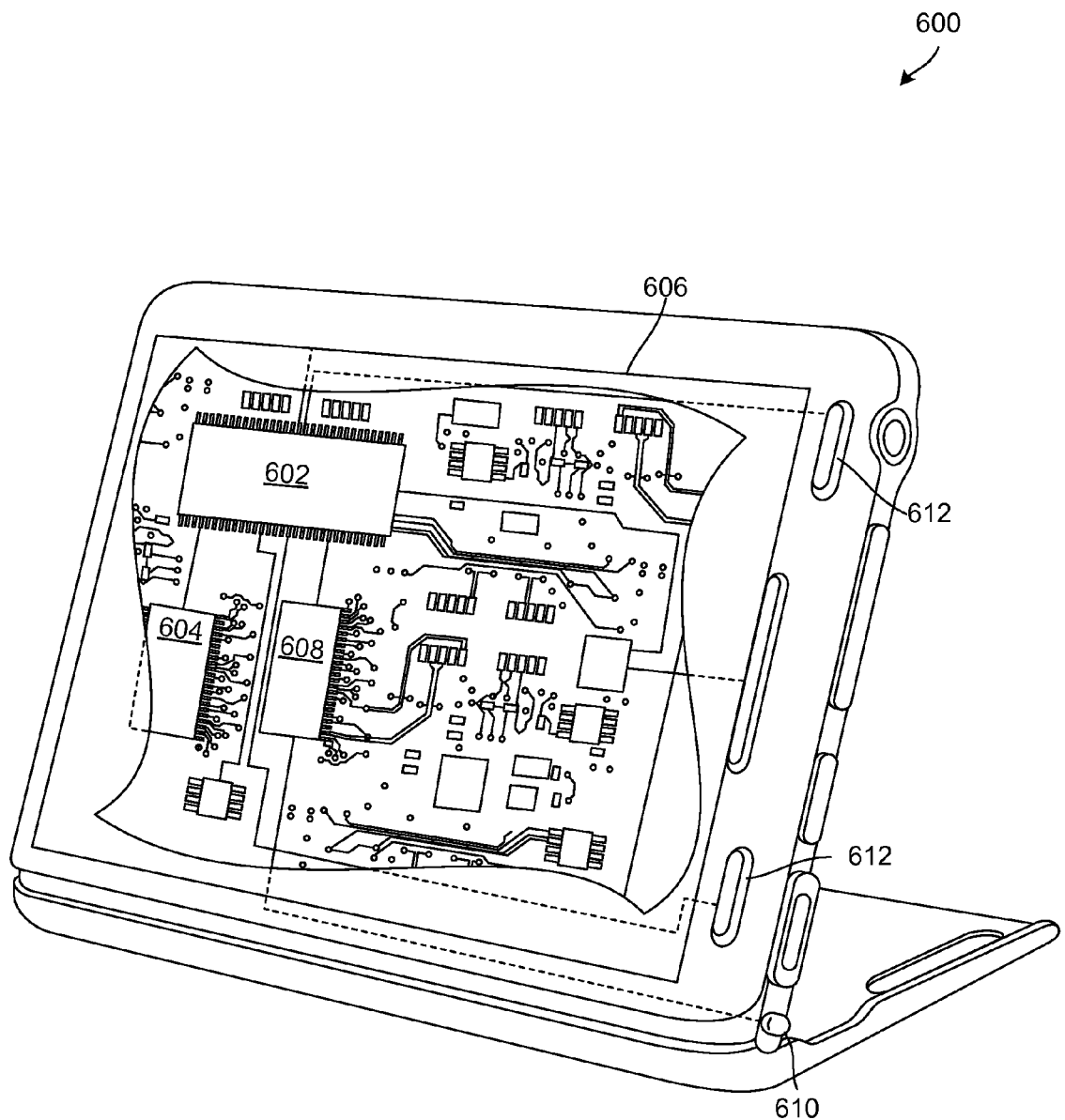
FIG. 6 is an illustration of an example mobile device suitable for use with the various embodiments.
Figure 7:
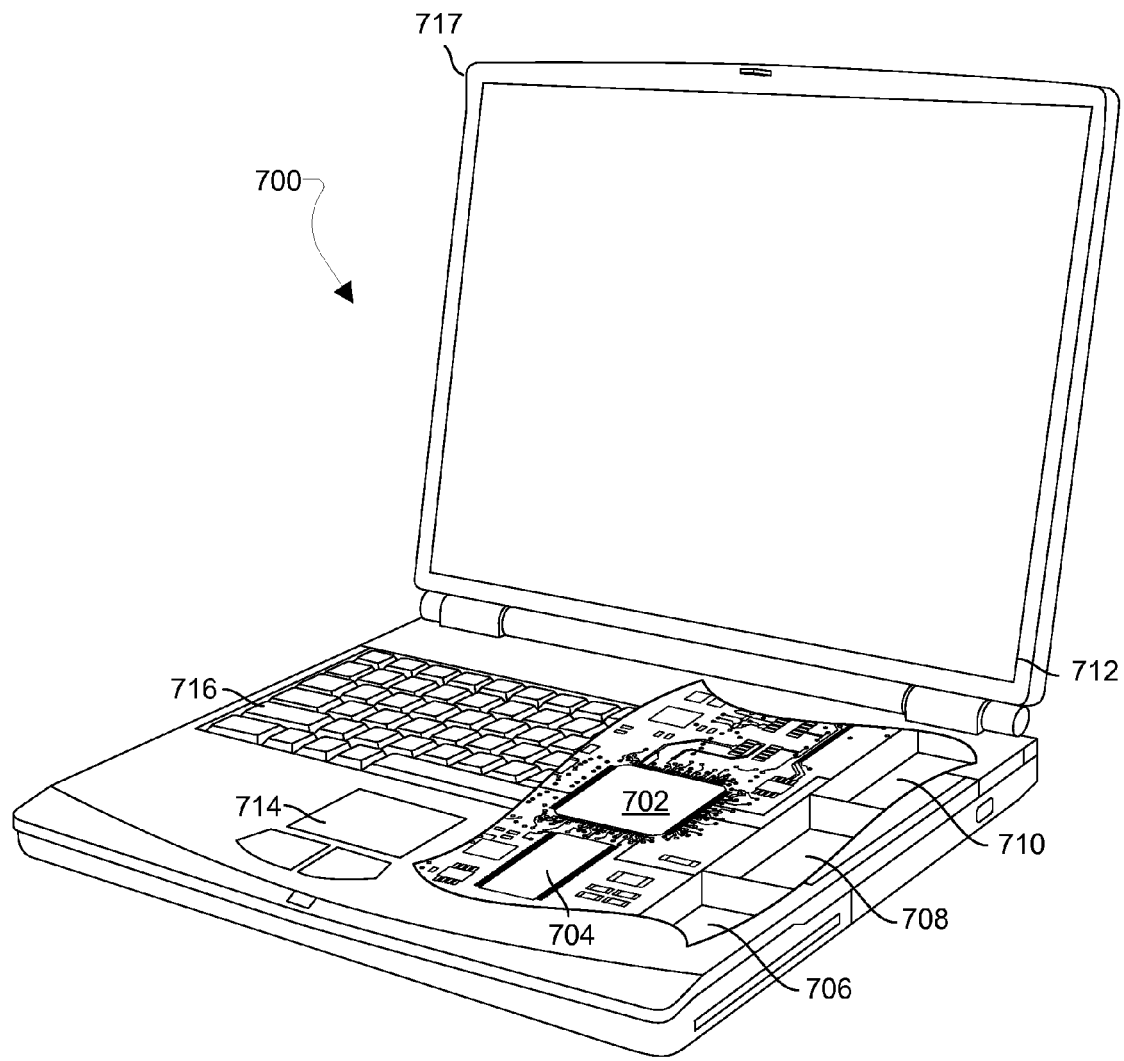
FIG. 7 is an illustration of an example laptop computer suitable for use with the various embodiments.

The various embodiments may also be implemented using any commercial computing device, some examples of which are illustrated in FIGS. 6-7. Typical mobile computing devices 600 will have in common the components illustrated in FIG. 6. For example, mobile computing devices 600 may include a processor 602 coupled to an internal memory 604 and a touch surface input device/display 606, such as a resistive sensing touchscreen, capacitive sensing touchscreen, infrared sensing touchscreen, acoustic/piezoelectric sensing touchscreen, or the like. The computing device 600 may have a radio/antenna 610 for sending and receiving electromagnetic radiation that is connected to a wireless data link and/or cellular telephone transceiver 608 coupled to the processor 602. Computing devices 600 may also include physical buttons 612 for receiving user inputs.

Other forms of computing devices, including personal computers and laptop computers, may be used to implementing the various embodiments. Such computing devices typically include the components illustrated in FIG. 7, which illustrates an example personal laptop computer 700. Such a personal computer 700 generally includes a processor 702 coupled to volatile memory 704 and a large capacity nonvolatile memory, such as a disk drive 706. The computer 700 may also include a compact disc (CD) and/or DVD drive 708 coupled to the processor 702. The computer device 700 may also include a number of connector ports coupled to the processor 702 for establishing data connections or receiving external memory devices, such as a network connection circuit for coupling the processor 702 to a network. The computing device 700 may have a radio/antenna 710 for sending and receiving electromagnetic radiation that is connected to a wireless data link coupled to the processor 702. The computer 700 may further be coupled to a keyboard 716, a pointing device such as a mouse 714, and a display 712 as is well known in the computer arts.

The processors 602, 702 may be any programmable microprocessor, microcomputer or multiple processor chip or chips that may be configured by software instructions (applications) to perform a variety of functions, including the functions of the various embodiments described herein. Multiple processors may be provided, such as one processor dedicated to wireless communication functions and one processor dedicated to running other applications. Typically, software applications may be stored in the internal memory before they are accessed and loaded into the processor 602, 702. In some devices, the processor 602, 702 may include internal memory sufficient to store the application software instructions. In some mobile devices, the secure memory may be in a separate memory chip coupled to the processor 602, 702. The internal memory may be a volatile or nonvolatile memory, such as flash memory, or a mixture of both. For the purposes of this description, a general reference to memory refers to all memory accessible by the processor, including internal memory, removable memory plugged into the device, and memory within the processor 602, 702 itself.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A memory system, comprising:
a first memory;
a first memory controller coupled to the first memory; and
a master controller module included in the first memory controller configured to perform at least one direct memory access operation to effect at least one memory-to-memory data transfer operation between the first memory and a second memory, under control of a second memory controller, using a system bus once;
wherein the first memory controller including the master controller module is configured to perform operations comprising:
receiving a source address and a destination address;
determining whether the source address is in the first memory;
determining whether the destination address is in the first memory; and
copying the destination address and data stored at the source address to the second memory controller using the system bus once in response to determining that the source address is in the first memory and the destination address is not in the first memory.

2. The memory system of claim 1, wherein the first memory controller is a double data rate (DDR) memory controller and the first memory is a DDR synchronous dynamic random-access memory.

3. The memory system of claim 1, wherein the first memory controller is a dynamic random-access memory (DRAM) memory controller.

4. The memory system of claim 1, wherein the second memory controller is a double data rate (DDR) memory controller and the second memory is a DDR synchronous dynamic random-access memory.

5. The memory system of claim 1, wherein the first memory controller including the master controller module is configured to perform operations further comprising:
pushing data stored at the source address onto the system bus in response to determining that the source address is in the first memory and the destination address is not in the first memory.

6. The memory system of claim 1, wherein the first memory controller including the master controller module is configured to perform operations further comprising:
pushing the destination address onto the system bus in response to determining that the source address is in the first memory and the destination address is not in the first memory.

7. A computing device, comprising:
a system data bus;
a processor coupled to the system data bus; and
a memory system coupled to the system data bus, the memory system comprising:
a first memory;
a first memory controller coupled to the first memory; and
a master controller module included in the first memory controller configured to perform at least one direct memory access operation to effect at least one memory-to-memory data transfer operation between the first memory and a second memory, under the control of a second memory controller, using the system bus once;
wherein the first memory controller including the master controller module is configured to perform operations comprising:
receiving a source address and a destination address;
determining whether the source address is in the first memory;
determining whether the destination address is in the first memory; and
copying the destination address and data stored at the source address to the second memory controller using the system bus once in response to determining that the source address is in the first memory and the destination address is not in the first memory.

8. The computing device of claim 7, wherein the first memory controller is a double data rate (DDR) memory controller and the first memory is a DDR synchronous dynamic random-access memory.

9. The computing device of claim 7, wherein the first memory controller is a dynamic random-access memory (DRAM) memory controller.

10. The computing device of claim 7, wherein the second memory controller is a double data rate (DDR) memory controller and the second memory is a DDR synchronous dynamic random-access memory.

11. The computing device of claim 7, wherein the first memory controller including the master controller module is configured to perform operations further comprising:
pushing data stored at the source address onto the system bus in response to determining that the source address is in the first memory and the destination address is not in the first memory.

12. The computing device of claim 7, wherein the first memory controller including the master controller module is configured to perform operations further comprising:

pushing the destination address onto the system bus in response to determining that the source address is in the first memory and the destination address is not in the first memory.

13. A method of transferring data to and from one or more memories, comprising:

receiving a source address and a destination address in a first memory controller that includes a master controller module, the master controller module included in the first memory controller configured to perform at least one direct memory access operation to effect at least one memory-to-memory data transfer operation between a first memory under control of the first memory controller and a second memory, under control of a second memory controller, using a system bus once;

determining in the first memory controller whether the source address is in the first memory;

determining in the first memory controller whether the destination address is in the first memory; and copying the destination address and data stored at the source address to the second memory controller using the system bus once when the first memory controller determines that the source address is in the first memory and the destination address is not in the first memory.

14. The method of claim 13, further comprising:

pushing data stored at the source address onto the system bus in response to determining that the source address is in the first memory and the destination address is not in the first memory.

15. The method of claim 13, further comprising:

pushing the destination address onto the system bus in response to determining that the source address is in the first memory and the destination address is not in the first memory.

16. The method of claim 13, wherein receiving the source address and the destination address in the first memory controller comprises receiving the source address and the destination address from a peripheral component, or from a processing unit, through the system bus.

17. The method of claim 13, wherein determining in the first memory controller whether the source address is in the first memory comprises determining in a dynamic random-access memory (DRAM) memory controller whether the source address is in the first memory.

18. The method of claim 13, wherein determining in the first memory controller whether the source address is in the first memory comprises determining in a double data rate (DDR) memory controller whether the source address is in a DDR synchronous dynamic random-access memory.

19. A computing device, comprising:

means for receiving a source address and a destination address in a first memory controller that includes a master controller module, the master controller module included in the first memory controller configured to perform at least one direct memory access operation to effect at least one memory-to-memory data transfer operation between a first memory under control of the first memory controller and a second memory, under control of a second memory controller, using a system bus once;

means for determining in the first memory controller whether the source address is in the first memory;

means for determining in the first memory controller whether the destination address is in the first memory; and means for copying the destination address and data stored at the source address to the second memory controller using the system bus once when the first memory controller determines that the source address is in the first memory and the destination address is not in the first memory.

20. The computing device of claim 19, further comprising:

means for pushing data stored at the source address onto the system bus in response to determining that the source address is in the first memory and the destination address is not in the first memory.

21. The computing device of claim 19, further comprising:

means for pushing the destination address onto the system bus in response to determining that the source address is in the first memory and the destination address is not in the first memory.

22. The computing device of claim 19, wherein the means for receiving the source address and the destination address in the first memory controller comprises means for receiving the source address and the destination address from a peripheral component or a processing unit through the system bus.

23. The computing device of claim 19, wherein the means for determining in the first memory controller whether the source address is in the first memory comprises means for determining in a dynamic random-access memory (DRAM) memory controller whether the source address is in the first memory.

24. The computing device of claim 19, wherein the means for determining in the first memory controller whether the source address is in the first memory comprises means for determining in a double data rate (DDR) memory controller whether the source address is in a DDR synchronous dynamic random-access memory.

\* \* \* \* \*